(12) United States Patent
Randrianarivony

(10) Patent No.: US 11,971,105 B2
(45) Date of Patent: Apr. 30, 2024

(54) SWIVEL COMPRISING A SEALING ARRANGEMENT

(71) Applicant: SINGLE BUOY MOORINGS INC., Marly (CH)

(72) Inventor: Liva Christian Randrianarivony, Monaco (MC)

(73) Assignee: SINGLE BUOY MOORINGS INC., Marly (CH)

( * ) Notice: Subject to any disclaimer, the term of this patent is extended or adjusted under 35 U.S.C. 154(b) by 145 days.

(21) Appl. No.: 17/783,852

(22) PCT Filed: Dec. 10, 2020

(86) PCT No.: PCT/EP2020/085538
§ 371 (c)(1),
(2) Date: Jun. 9, 2022

(87) PCT Pub. No.: WO2021/116289
PCT Pub. Date: Jun. 17, 2021

(65) Prior Publication Data
US 2022/0373089 A1 Nov. 24, 2022

(30) Foreign Application Priority Data
Dec. 12, 2019 (EP) .................................... 19215675

(51) Int. Cl.
*F16J 15/32* (2016.01)
*F16J 15/3236* (2016.01)
*F16J 15/3268* (2016.01)

(52) U.S. Cl.
CPC ....... *F16J 15/3236* (2013.01); *F16J 15/3268* (2013.01)

(58) Field of Classification Search
CPC .............................. F16J 15/3236; F16J 15/3268
See application file for complete search history.

(56) References Cited

U.S. PATENT DOCUMENTS 4,626,003 A    12/1986   Williams et al.
4,647,076 A *   3/1987   Pollack ................... F16L 39/06
                                                       285/379

(Continued)

FOREIGN PATENT DOCUMENTS

EP         2 853 351       4/2015

OTHER PUBLICATIONS

International Search Report for PCT/EP2020/085538, dated Feb. 8, 2021, 3 pages.

(Continued)

*Primary Examiner* — Vishal A Patel
(74) *Attorney, Agent, or Firm* — NIXON & VANDERHYE

(57) ABSTRACT

Disclosed is a swivel including inner and outer mutually rotatable swivel members having respective inner fluid paths communicating with each other through an annular space at an interface between the swivel members and being provided with a sealing arrangement on a side of the annular space at the interface including a peripheral groove provided in the inner and/or outer swivel member, and a sealing element received therein and arranged for static sealing against a first one of the swivel members, inside the groove and for dynamic sealing against a second one of the swivel members, a surface inside the groove in the first one of the swivel members abutting the sealing element being a textured surface extending along at least a part of one or more inner surfaces of the groove and having three-dimensional textural elements for making frictional contact with the sealing element.

20 Claims, 6 Drawing Sheets

(56) References Cited

U.S. PATENT DOCUMENTS

| 4,900,042 | A | * | 2/1990 | Genda | F16J 15/164 |
| | | | | | 277/572 |
| 4,921,258 | A | * | 5/1990 | Fournier | F16L 17/035 |
| | | | | | 137/526 |
| 4,925,219 | A | * | 5/1990 | Pollack | F16L 27/087 |
| | | | | | 285/98 |
| 5,242,198 | A | | 9/1993 | Pollack | |
| 5,316,351 | A | * | 5/1994 | Czimny | F16L 27/082 |
| | | | | | 277/390 |
| 8,413,994 | B2 | * | 4/2013 | Jordan | F16J 15/164 |
| | | | | | 277/552 |
| 2020/0072355 | A1 | * | 3/2020 | Crudu | F16J 15/3236 |

OTHER PUBLICATIONS

Written Opinion of the ISA for PCT/EP2020/085538, dated Feb. 8, 2021, 8 pages.
International Preliminary Report on Patentability with amended sheets for PCT/EP2020/085538, dated Mar. 23, 2022, 14 pages.

* cited by examiner

SWIVEL COMPRISING A SEALING ARRANGEMENT

This application is the U.S. national phase of International Application No. PCT/EP2020/085538 filed Dec. 10, 2020 which designated the U.S. and claims priority to EP Patent Application No. 19215675.0 filed Dec. 12, 2019, the entire contents of each of which are hereby incorporated by reference.

FIELD OF THE INVENTION

The present invention relates to a swivel comprising an inner swivel member and an outer swivel member that is arranged rotatably around the inner swivel member, wherein the swivel members have respective fluid paths communicating with each other through an annular space at an interface between the swivel members, the swivel being provided with a sealing arrangement on a side of the annular space at the interface, the sealing arrangement comprising a peripheral groove provided in the inner swivel member and/or in the outer swivel member, and a sealing element received within the peripheral groove and arranged for static sealing against a first one of the swivel members, inside the peripheral groove and for dynamic sealing against a second one of the swivel members.

The present invention further relates to a shim for a method of mounting a sealing element in a peripheral groove of a swivel.

BACKGROUND ART

A swivel with a sealing arrangement is known from U.S. Pat. No. 8,814,220. The swivel sealing arrangement is a critical part of the swivel stack; the seals restrict the fluids to their respective fluid paths and ensure fluid path integrity under the most severe conditions.

During weathervaning of an offshore production unit comprising such a swivel, the seal normally remains static in the seal groove, while the rotating part of the swivel moves over the seal running face.

However, under operational conditions the friction coefficient at the seal running surface and/or seal groove surface may change, causing part of the seal move along with the swivel rotating part while another part of the seal remains static inside the seal groove, ultimately resulting in radial rupture of the seal or the anti-extrusion ring. Common causes of seal failure are found in seal compression/elongation causing an increase in friction at the running face side, and/or in a build-up of liquid between the seal and the seal groove, such as an "oil pocket", causing local decrease in friction at the seal groove side.

The present invention seeks to provide a swivel comprising a sealing arrangement with improved resistance to such seal failure.

SUMMARY OF THE INVENTION

Hereto, according to a first aspect, the present invention provides a swivel comprising an inner swivel member and an outer swivel member that is arranged rotatably around the inner swivel member, wherein the swivel members have respective fluid paths communicating with each other through an annular space at an interface between the swivel members, the swivel being provided with a sealing arrangement on a side of the annular space at the interface, the sealing arrangement comprising: —a peripheral groove provided in the inner swivel member and/or in the outer swivel member; and —a sealing element received within the peripheral groove and arranged to statically seal against a first one of the swivel members, inside the peripheral groove and to dynamically seal against a second one of the swivel members; wherein a surface inside the peripheral groove in the first one of the swivel members abutting the sealing element is a textured surface extending along at least a part of two inner surfaces of the peripheral groove, the textured surface having three-dimensional textural elements for making frictional contact with the sealing element and wherein a cross-sectional shape of the textured surface, seen perpendicular to a radial plane of the peripheral groove, is substantially L-shaped.

Due to the increased frictional contact provided by the textured surface, the position of the sealing element relative to the textured surface can be kept substantially constant, in this manner reducing the risk of seal failure.

Furthermore, due to the textural elements pressing into a surface of the sealing element, local pressure differences occur on this surface, providing paths between the surface of the sealing element and the textured surface for any liquids which have leaked between the sealing element and the groove to flow through. This may substantially prevent the initial pooling of liquids, i.e. may prevent the formation of "oil pockets", which otherwise cause a localised reduction in friction on the static sealing side of the sealing element.

The L-shaped textured surface corresponds to the adjoining inner surfaces of the peripheral groove abutting the static sealing side of the sealing element. By providing texture along a substantial radial length of both surfaces stiction between the textured surface and the sealing element is improved.

The L-shaped textured surface may be used in a sealing arrangement, such as a piston sealing arrangement or a face sealing arrangement, in which the static sealing side of the sealing element abuts two adjoining inner surfaces of the peripheral groove. The textural elements which extend from a first to a second end of the L-shaped cross-section allow at least some liquid, which may have leaked to between the static sealing side of the sealing element and the peripheral groove, to be drained away, e.g. via a narrow passage provided between the inner and outer swivel members on an downstream side of the sealing element with respect to the annular space. Commonly, the pressure of liquid or fluid in such a narrow passage is monitored in order to detect swivel seal failure.

The seal commonly comprises or is made of a synthetic elastomeric or (thermo)plastic low friction material such as rubber, PTFE, PEEK and HDPE compounds, while the swivel members typically have smooth, closely machined, metallic surfaces, at least at the groove, having a surface roughness in the range of 0.2-0.8 μm Ra according to ISO 4287:1997. When the textured surface is a surface of the groove, e.g. formed by machining a texture into the groove, it provides an additional friction between the sealing element and the inner surface of the peripheral groove, which may also be referred to as improved stiction when the sealing element and inner surface are stationary with respect to one another. The textures surface having three-dimensional textural elements may be formed as grooves, ridges indents and/or protrusions, which can be formed by one or more techniques such as machining, etching, ablation, punching and/or the application of rough paint or other surface texturing layers such as mesh, sandpaper or textile. The increased static friction coefficient provided by the textured surface requires a larger change in the friction coefficient and/or shear force to reach a threshold friction and/or shear force beyond which a part of the sealing arrangement starts rotating within the peripheral groove. Thus the difference between stiction of the static sealing side of the sealing element and a friction coefficient of the dynamic sealing side of the sealing element is increased, providing improved circumferential stability of the sealing element when the inner swivel member rotates relative to the outer swivel member.

In an embodiment, the textural elements comprise ridges, which each have a longitudinal direction substantially extending in a radial plane of the peripheral groove. The radial plane is a plane both parallel to the radial direction of the groove and parallel to the central axis of the groove. In this manner an increase in circumferential stability in the rotational position of the sealing element may be achieved, without significantly increasing axial and/or radial stiction of the sealing element. Axial and radial movement of the sealing element ensure optimal functioning of the sealing element and it is therefore highly preferable that such movements are substantially not hindered.

The sealing element preferably comprises two external surfaces which each abut a different leg of the L-shaped textured surface.

Preferably a first leg of the L-shaped textured surface extends along an inner side surface of the peripheral groove and a second leg of the L-shaped textured surface extends along a first part of another surface of the peripheral groove which faces the sealing element, such that a second part of said other surface is non-textured. Herein, the sealing element abuts both the first and second part of the other surface. The non-textured part is a smooth surface that is having full contact with an abutting sealing element surface section along the circumference of the peripheral groove, for substantially preventing liquid from passing between the sealing element and the inner surface of the peripheral groove. A radial length of the textured surface along the one of the adjoining inner surfaces closest to the annular space may be chosen such that a predetermined optimum is achieved between substantially preventing liquid from passing in between the sealing element and the inner surface of the peripheral groove and a minimum required stiction for providing circumferential stability of the sealing element inside the peripheral groove.

In an embodiment, the outer swivel member is arranged for rotating around the inner swivel member around an axis of rotation, wherein the L-shaped shim comprises a first leg and a second leg, wherein the first, vertical, leg extends substantially parallel to the axis of rotation, and the second, horizontal, leg extends in a radial direction substantially normal to the axis of rotation. In this manner, the shim abuts two sides of the sealing element. Preferably, the second leg has a length along direction of the axis of rotation which is shorter, e.g. at least two times shorter, than the length of the first leg in the radial direction. In this manner rotational movement of the sealing element within the groove is substantially blocked, while some axial movement of the sealing element within the groove remains possible.

In an embodiment textured surface is arranged in the groove such that it surrounds the sealing element substantially over 350 degrees or more, preferably substantially over 360 degrees, i.e. a circle. The sealing element is thus substantially prevented from rotating in the groove around the entire circumference of the groove.

In an embodiment, the textured surface is an inner surface of the peripheral groove in the first one of the swivel members extending over the inner side surface and at least part of the bottom surface of the peripheral groove. The textured surface may thus be formed as an integral part of the groove, and the sealing element may be placed in the groove to directly contact the textured surface of the groove.

In an embodiment, the sealing arrangement comprises a shim, positioned between the sealing element and an inner surface of the peripheral groove in the first one of the swivel members, wherein the shim forms the textured surface. Such a shim can be provided separately and has the additional benefit of allowing implementation of the invention in existing sealing arrangements of swivels. The shim can be inserted in the groove, after which a sealing element can be mounted in the groove in a manner that the sealing element abuts the shim. Where an L-shaped shim is used, the L-shape helps to maintain the shim in a corner of the peripheral groove, closed in by the sealing element. This reduces the risk of jamming of the swivel, which might occur if the shim would move and become stuck between the inner and outer swivel members through a seal extrusion gap, which is present on two sides of the peripheral groove. Preferably, the shim is made from, or comprises, a metal, e.g. is formed from a metal or metal-alloy plate that is provided with a plurality through openings and/or cut-out sections which form the textural elements.

Typically, the shim spans substantially the entire inner surface of the groove, and preferably, at least one hundred such through openings and/or cut-out sections are provided around the circumference of the shim.

In an embodiment the shim has an undulating and/or zig-zag shape extending along the circumferential direction of the peripheral groove, or the shim comprises protruding finger portions which extend perpendicular to the circumferential direction of the peripheral groove, preferably toward a bottom end of the shim. Such repeating shape patterns are easily manufactured. The shim may be manufactured for instance by first machining a strip of sheet material, such as sheet metal or a sheet metal-alloy, and providing the textured surface pattern in the strip. The manufacturing may for instance comprise a step or steps of punching, engraving, laser cutting, water jet cutting or milling method to cut the strip and/or provide the textural elements in the strip. The strip of material is cut or machined to a predetermined length which preferably substantially matches circumferentially the length of the groove in which the strip is to be placed. The resulting shim is a longitudinal strip of sheet material, provided with a series of parallel elongated openings and/or grooves which have their longitudinal direction perpendicular to the longitudinal direction of the strip forming the textural elements. A number of the series of parallel longitudinal openings and/or grooves in the shim may extend into a peripheral side of the strip, such that said openings and/or grooves are not delimited on said peripheral side of the strip.

A subsequent manufacturing step may be performed wherein the length of textured surface patterned strip is folded to have an L-shaped cross-section when seen in the longitudinal direction of the strip. The L-shape preferably has a folding line intersecting at least a some of the number of parallel longitudinal openings extending through a side of the strip, which allows the leg of the L-shape to be arranged in the groove such that it abuts the surface of the peripheral groove perpendicular to a rotation axis of the swivel members conforming to an in-plane curvature thereof without in-plane compression occurring in said leg.

For installation in a swivel, first the shim is placed in the peripheral groove, followed by the sealing element.

Preferably the shim comprises or is made of a metallic material and/or metal alloy having a tensile strength of at least 100 MPa according to ASTM E8/E8M-16a and a hardness of at least 60 Rockwell B according to ISO 6508.1-2015. Materials from a group comprising stainless steel, copper alloys, aluminium alloys and austenitic nickel-chromium-based alloys may be used. A preferred material for the shim is a stainless steel as listed in ISO standard 15510:2010, in particular AISI316L stainless steel, which is known to be resistant to corrosion and has sufficient strength.

The textured surface may be provided in segments, but according to a preferred embodiment, the textured surface is an evenly textured and uninterrupted surface extending along the entire circumference of the peripheral groove, causing the friction force to be substantially homogeneous along the circumference of the peripheral groove.

Where a shim is used to provide the textured surface, having the textured surface being an evenly textured and uninterrupted surface extending along the entire circumference of the peripheral groove means that the shim is ring shaped. Such a ring shaped shim is provided as a strip of material having a length substantially equal to the circumference of the peripheral groove, such that the strip forms the ring once inserted, allowing the shim being inserted as a single element. This has the advantage of being easier and faster to place and replace during manufacturing and maintenance/repairs. After insertion, the abutting ends of the shim may be joined to form a permanent ring element, for example by welding.

According to an embodiment the sealing element comprises a lip-seal, which has two flexible legs arranged in a general C-, U- or V-shaped orientation with both legs extending between respective surfaces of the inner and outer swivel members.

The legs make the seal adaptable to pressure changes as well as variations in surface smoothness of the swivel members at the running side of the seal, where the second one of the swivel members slides along the surface of the seal. This allows the C-, U- or V-shaped seal to provide reliable sealing of the gap between the inner and outer swivel members whilst allowing the swivel members to rotate with respect to one another.

In an embodiment the sealing element further comprises an anti-extrusion ring element which abuts the textured surface, i.e. abuts the textured surface provided by the shim or the textured surface of the inner groove. The anti-extrusion ring is manufactured from a stiffer material than the dynamic sealing side of the sealing element, to preventing the dynamic porsion of the sealing element from deforming into the narrow passage downstream thereof with respect to the annular passage. Such an anti-extrusion ring makes the sealing arrangement suitable for use in high-pressure swivels. The anti-extrusion ring is preferably arranged around the dynamic sealing side of the sealing element around a portion of the sealing element to which the two flexible legs are connected.

According to a second aspect the present invention provides a shim for a sealing arrangement, wherein the shim is adapted for forming a textured surface extending along at least part of one or more inner surfaces of a peripheral groove in which the sealing arrangement is to be placed, wherein the shim is a longitudinal strip of sheet material, provided with a series of parallel longitudinal openings and/or grooves perpendicular to the longitudinal direction of the strip forming the textural elements.

In an embodiment a number of the series of parallel longitudinal openings and/or grooves in the shim extend into a side of the strip, such that said openings and/or grooves are not delimited on said side of the strip.

In an embodiment the shim is L-shaped when seen in the longitudinal direction, the L-shape having a folding line intersecting at least some of the number of the parallel longitudinal openings extending through a side of the strip.

According to a third aspect, the present invention provides an assembly of a shim according to the second aspect and a sealing element arranged concentrically within the shim and abutting the shim.

According to a fourth aspect, the present invention provides a method of mounting a sealing element in a peripheral groove of a swivel, the method comprising: providing at least one textured surface in the peripheral groove, extending along at least a part of two adjoining inner surfaces of the peripheral groove, the textured surface having textural elements which each have a longitudinal direction substantially extending in a radial plane of the peripheral groove; and inserting a sealing element within the peripheral groove, such that at least a part of one surface abuts one of the two adjoining textured surfaces and one adjoining surface of the sealing element abuts the other of the adjoining textured surfaces. The swivel preferably comprises an inner swivel member and an outer swivel member that is arranged rotatably around the inner swivel member, wherein the swivel members have respective fluid paths communicating with each other through an annular space at an interface between the swivel members. After the sealing element has been placed in the groove, a swivel according to the first aspect of the invention may be obtained.

SHORT DESCRIPTION OF DRAWINGS

Embodiments of a swivel according to the present invention will be described by way of example, with reference to the attached drawings, in which FIG. 1 shows a part of a swivel having an annular space between an inner and outer swivel member and comprising a sealing arrangement for preventing leakage of the annular space.

FIGS. 2A and 2B respectively show a piston sealing arrangement and a face sealing arrangement in a close-up of section II of FIG. 1.

DESCRIPTION OF EMBODIMENTS

Figure 1:
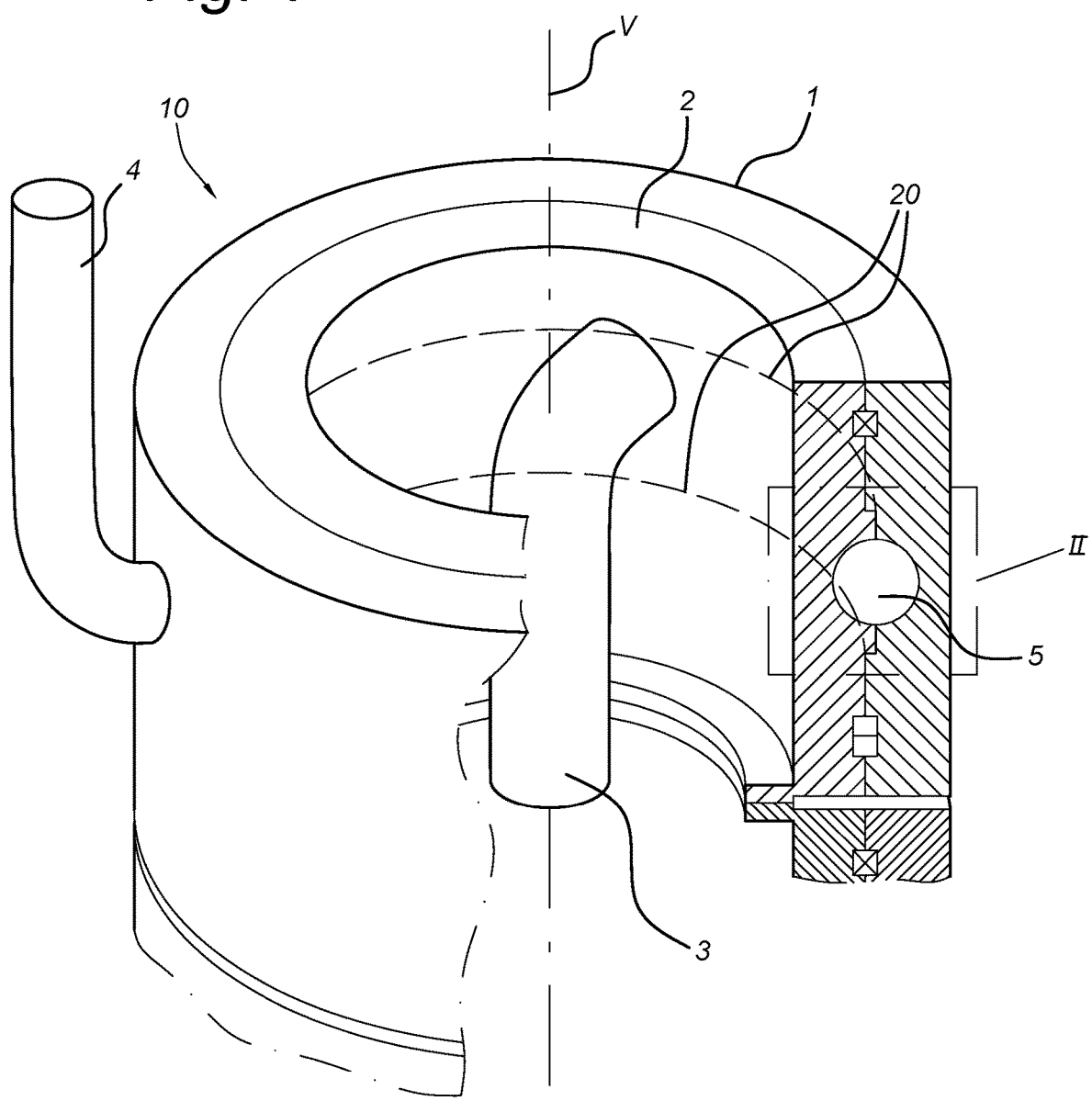

FIG. 1 shows a part of a swivel 10 having an annular space 5 between an inner and outer swivel member 2, 1 for transferring a fluid, e.g. a liquid such as LNG or liquid mixture of hydrocarbons, from a fluid path defined by inlet pipe 3, which is connected to a riser or the like, to a fluid path defined by pipe 4, which is connected to a storage facility on a vessel weathervaning around said riser. The swivel 10 comprises sealing arrangements 20 for preventing leakage of the annular space 5, which sealing arrangements 20 are positioned on both sides of and parallel to the annular space 5 in a gap between the inner and outer swivel members 2, 1. The inner and outer swivel members 2, 1 are tubular members which are arranged coaxially around a longitudinal axis of rotation V, with both the annular space 5 and sealing arrangements 20 extending along the complete circumference of an outer wall of the inner swivel member 2 and an inner wall of the outer swivel member 1. The sealing arrangements 20 above and below the annular space 5 are located in such a manner that they perform a sealing function in the operative position of the swivel.

Figure 2A:
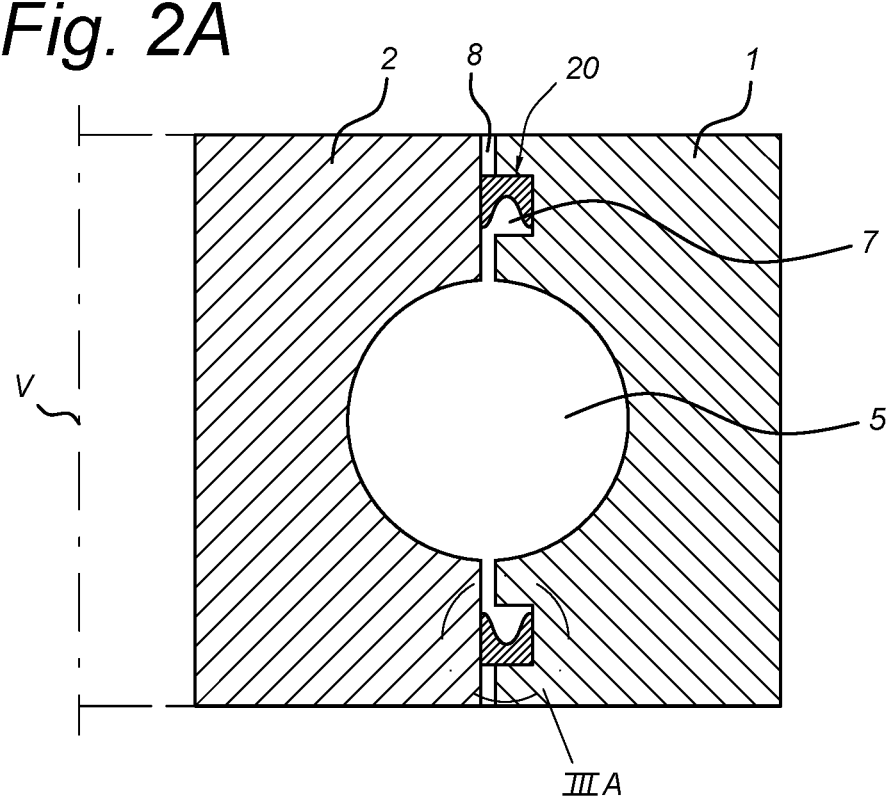
Figure 2B:
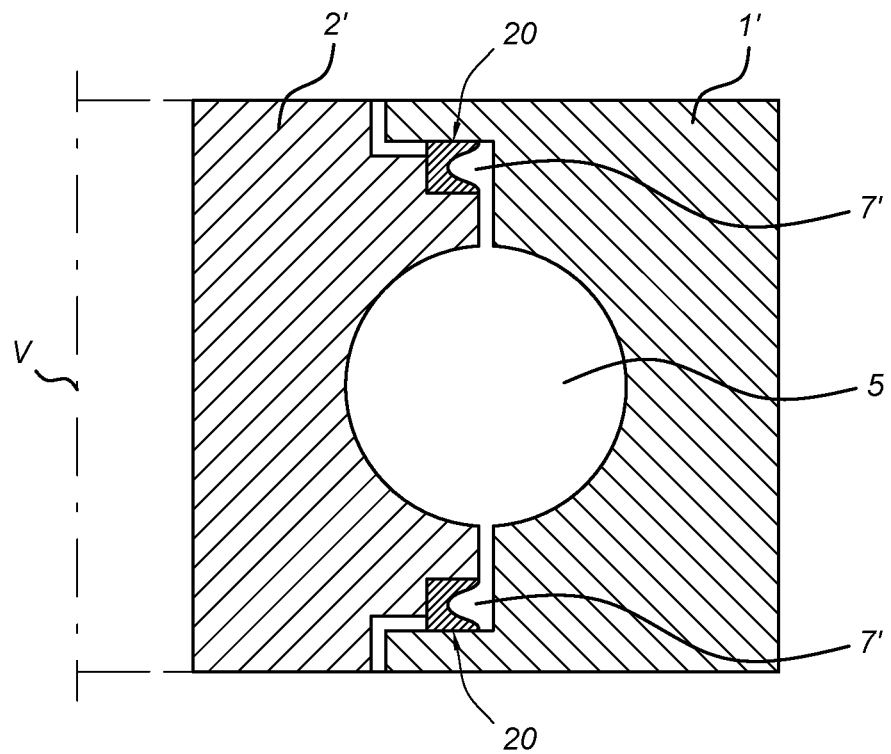

FIGS. 2A and 2B respectively show a piston sealing arrangement and a face sealing arrangement as may be used in section II of FIG. 1, both types of sealing arrangement being commonly used.

In FIG. 2A the inner wall of the outer swivel member 1 and the outer wall of the inner swivel member 2 above and below the annular space 5 are vertical walls. The sealing arrangements 20 are provided in the inner wall of the outer swivel member 1 some distance above and below the annular space 5. The sealing arrangement 20 comprises a peripheral groove 7, inside which a sealing element is located having a static position with respect to the inner wall of the outer swivel member 1 and having a running surface abutting the outer wall of the inner swivel member 2 for providing dynamic sealing during rotation of the inner swivel member 1 with respect to the outer swivel member 2. An concave side of a lip-seal that may form or be part of the sealing element is positioned parallel to a space between the outer wall of the inner swivel member 2 and an inner wall of the outer swivel member 1 extending from the annular space 5. Thus, when the pressure of fluid in the chamber 5 is greater than the pressure at the downstream side 8 of the gap between the inner and outer swivel members 1,2, the legs of the lip-seal will be pushed apart to provide a seal between the inner and outer swivel member.

In FIG. 2B the outer wall of the inner swivel member 2' and the inner wall of the outer swivel member 1' are stepped walls having an interference fit such that a longer channel running from the annular space is formed between the respective walls whilst the swivel members maintain their rotatability with respect to one another. Peripheral grooves 7' are provided in the outer wall of the inner swivel member 1' at predefined locations along the channel, some distance above and below the annular space 5. The sealing arrangement 20 is provided in the peripheral groove 7', having a static position with respect to the outer wall of the inner swivel member 2' and having a running surface abutting the inner wall of the outer swivel member 1' for providing dynamic sealing during rotation of the inner swivel member 2' with respect to the outer swivel member 1'. An opening of a lip-seal that is part of the sealing arrangement 20 is positioned perpendicular to a space between the outer wall of the inner swivel member 2' and the inner wall of the outer swivel member 1' extending from the annular space 5.

Alternative shapes of the inner wall of the outer swivel member 1 and the outer wall of the inner swivel member 2 and the positioning of the peripheral grooves having the sealing arrangement 20 located therein are possible.

Figure 3A:
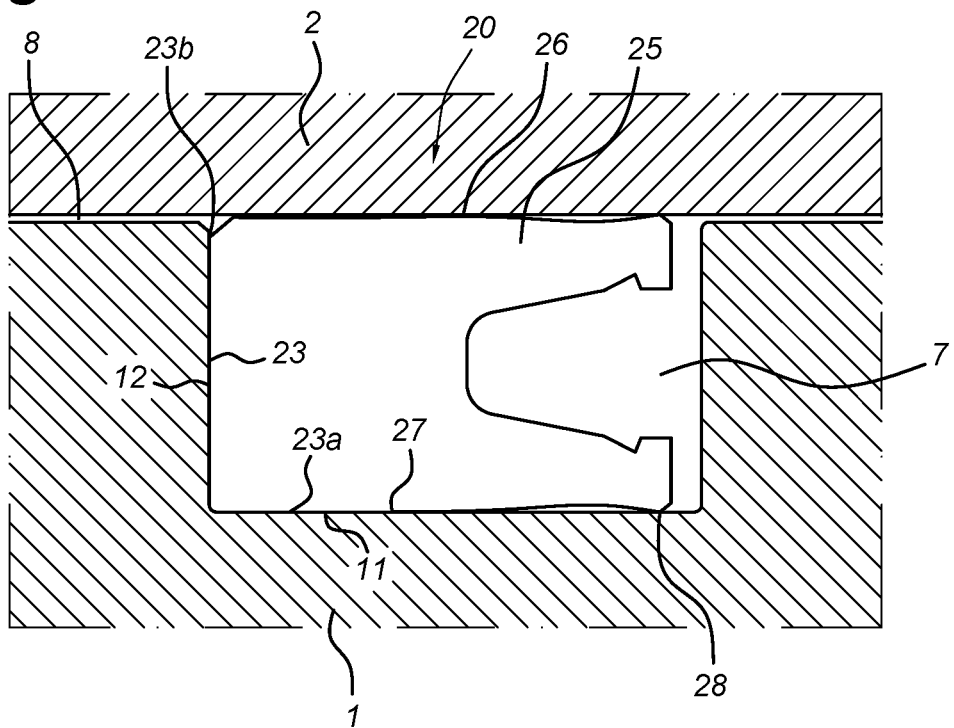
FIGS. 3A and 3B show respectively a radial cross-section of a sealing arrangement according to an embodiment of the invention, in which a textured surface that is formed as part of the groove abuts the seal, and a schematical isometric view of said textured surface.
Figure 4A:
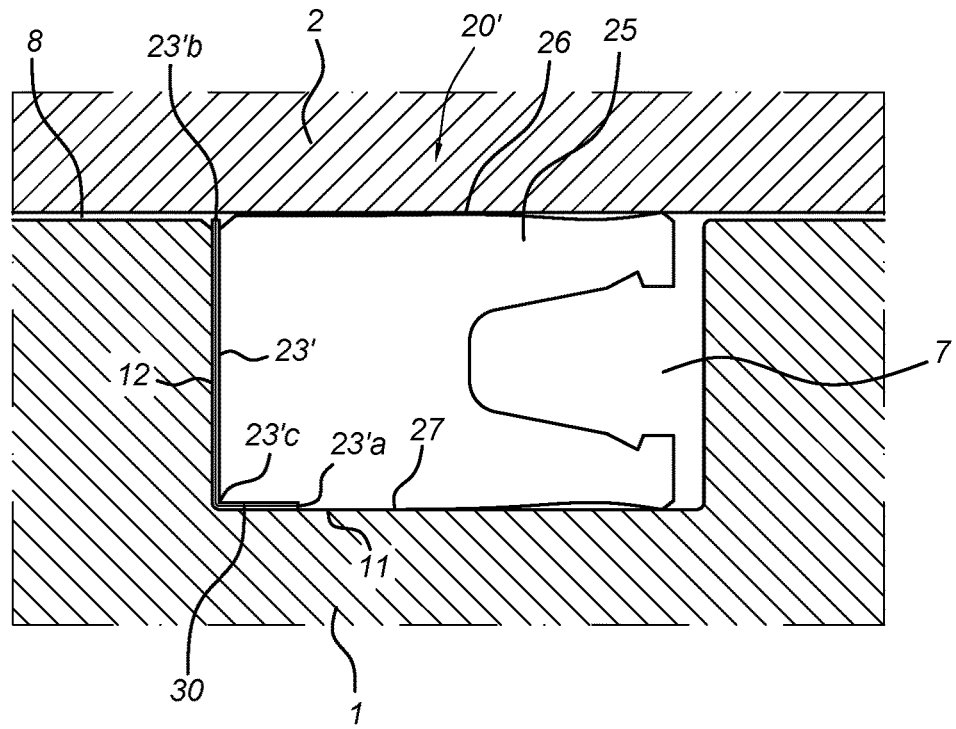
FIGS. 4A and 4B show respectively a radial cross-section of a sealing arrangement according to an embodiment of the invention in which a shim which forms the textured surface is inserted into the groove, and a radial cross-section of a sealing arrangement according to an embodiment of the invention, comprising such a shim abutting an anti-extrusion ring element.
Figure 4B:
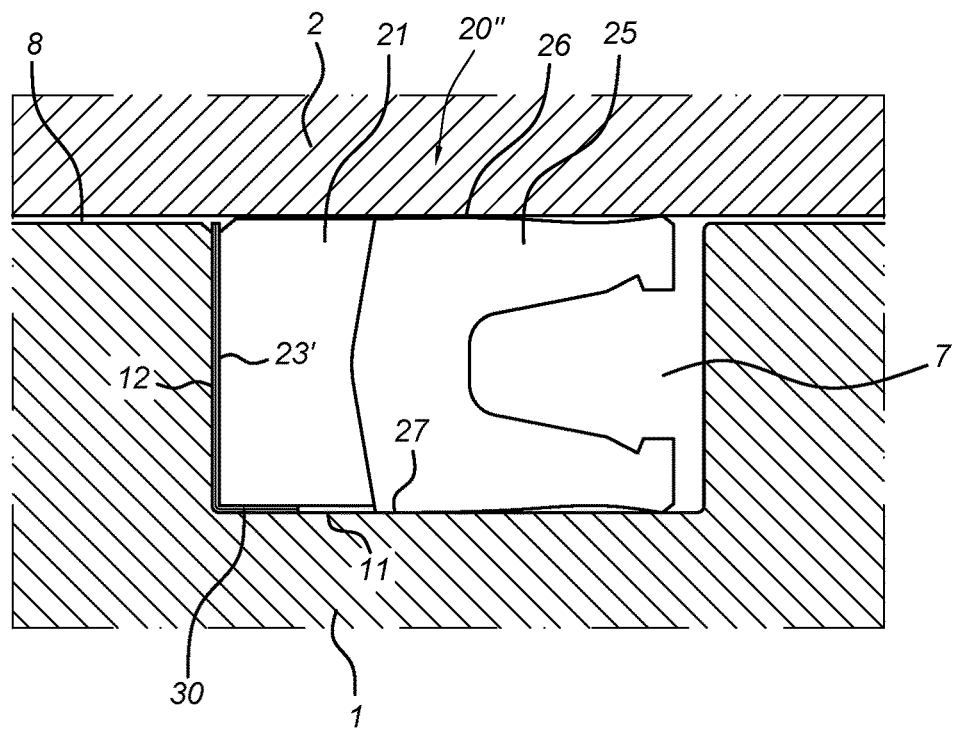

The sealing elements are described in more detail in relation to FIGS. 3A, 4A and 4B, as placed in a piston sealing arrangement 20 depicted in FIG. 2A. It will be obvious to the skilled person that these sealing elements may be used mutatis mutandis in the face sealing arrangement 20' depicted in FIG. 2B.

FIG. 3A schematically shows a radial cross-section of a sealing arrangement 20 according to an embodiment of the invention, in which the peripheral groove 7 is provided in the inner wall of the outer swivel member 1 and wherein a textured surface 23 that has been machined into the inner surface of the groove abuts a sealing element 25. Though not visible in FIG. 3A, three-dimensional structural elements 39a,39b of the textured surface 23 are schematically shown in FIG. 3B.

The sealing element 25 is a lip-seal having a U-shape and is well known for use in offshore swivels. The lip-seal is positioned inside the peripheral groove 7 and has a first outer leg surface 27 abutting a bottom surface 11 of said groove and has a second outer leg surface 26 abutting the outer wall of the inner swivel member 2. A side of the seal connecting the first and second legs abuts an inner side surface 12 of the peripheral groove 7, which inner side surface adjoins the bottom surface 11 of the groove. The legs of the sealing element 25 press outwards, achieving a sealing effect between the inner and outer swivel members. The bottom and adjoining inner side surfaces 11, 12 of the peripheral groove 7 comprise a textured surface 23 extending over the inner side surface 12 and part of the bottom surface 11. The textured surface 23 provides an increased stiction of the sealing element 25 inside the peripheral groove 7, in this manner improving the seal's circumferential stability therein. A part of the bottom surface 11 not adjoining the inner side surface 12 of the peripheral groove has a non-textured section, which is substantially as smooth and which provides a sealing zone for sealingly abutting the sealing element. The sealing zone radially extends along a section of the bottom surface 11 abutting at least the tip 28 of the lip-seal. The sealing zone generally prevents liquids flowing through the annular space 5 from passing the seal. However, in known sealing systems relatively small amounts of liquid are known to become trapped between the seal and one or more of the inner surfaces of the peripheral groove, for example due to imperfections in the seal or said inner surfaces. The textured surface 23 enable such trapped liquid to be drained past the textural elements to the downstream side 8 of the gap. The textural elements may run from a bottom end 23a of the textured surface to a top end 23b of the textured surface, the top end being at or near the downstream side 8 of the gap between the inner and outer swivel members 1, 2.

Figure 3B:
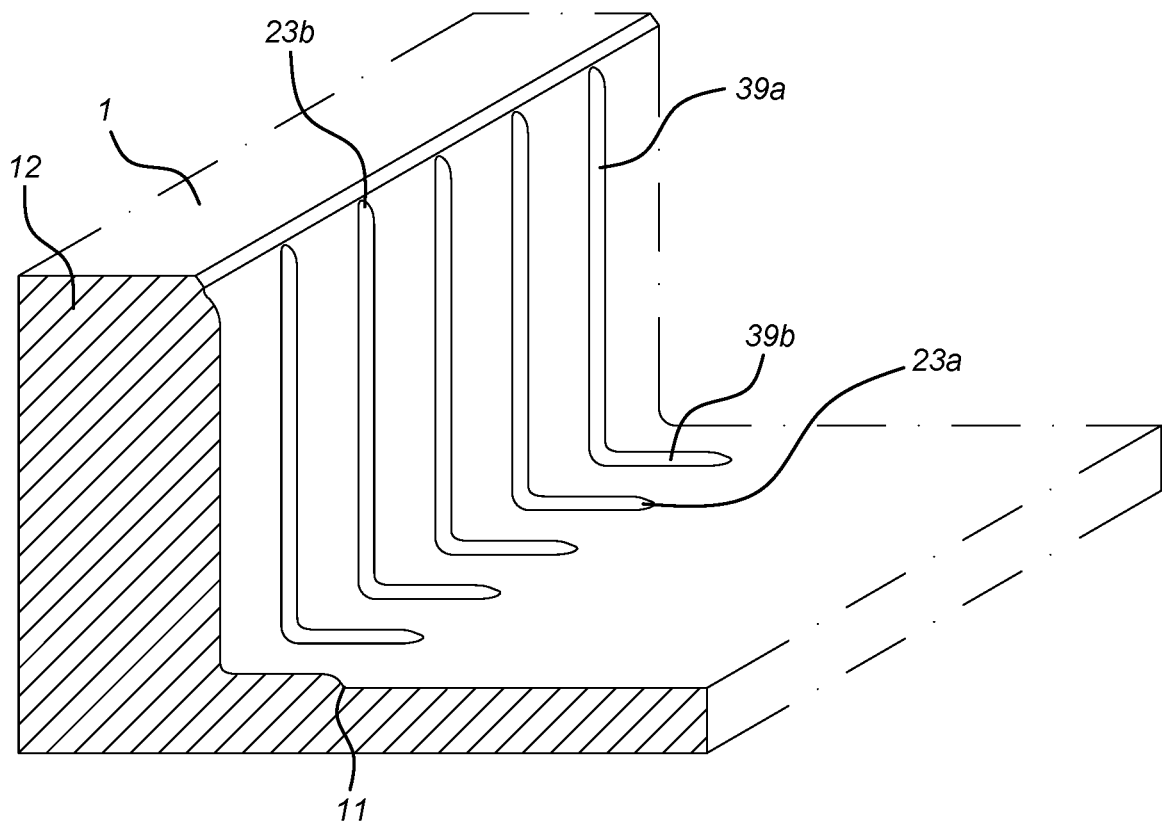

FIG. 3B schematically shows an isometric view of a portion of the groove 7 of which surfaces 11,12 are textured surfaces that have been provided with three-dimensional textural elements in the form of ridges 39a,39b. The ridges 39a,39b extend with their longitudinal directions in a radial plane of the groove. It will be appreciated that instead of continuous ridges 39a,39b shown in FIG. 3B other kinds of three-dimensional textural elements can be used that are adapted for providing greater friction with the sealing element in the rotational direction than along the radial planes of the groove. For instance, besides or instead of ridges, textural elements such as grooves, indents and/or protrusions, may be used. Such textural elements press into the abutting surface of the sealing element 25, effectively increasing the contact area between the sealing element and the inner surfaces of the peripheral groove and improving the grip between the surface(s) of the groove and the sealing element.

FIG. 4A schematically shows a radial cross-section of a sealing arrangement 20' according to another embodiment of the invention, in which the inner surface of the groove is substantially smooth. That is, the inner surfaces of the peripheral groove 7 may have a smoothness and surface finish similar to the inner surfaces of known peripheral grooves in swivels. In order to provide sufficient friction between the sealing element 25 and the inner surface of the groove, a shim 30 is provide which forms the textured surface 23'. The shim 30 is L-shaped, has a vertical leg extending along the height of the inner side surface 12 of the peripheral groove and has a horizontal leg extending along a section of the bottom surface 11 of the peripheral groove 7. The vertical leg has a free end 23'$b$ and an end 23'$c$ merging into the horizontal leg, the horizontal leg having a free end 23'$a$. The shape of the shim 30 provides the textured surface 23' abutting the sealing element 25, examples of which are shown in FIGS. 4A to 4C. An advantage of the configuration depicted in FIG. 4A is that the shim 30 can be added to existing sealing arrangements in swivels.

FIG. 4B schematically shows a radial cross-section of a sealing arrangement 20" according to an embodiment of the invention, wherein the sealing element additionally is provided with an anti-extrusion ring element 21. The anti-extrusion ring element 21 is positioned between the dynamic side of seal element 25 and the shim 30, such that a side of the lip-seal which connecting the first and second legs thereof abuts an inner circumferential surface of the anti-extrusion ring 21 and an outer circumferential surface of the anti-extrusion ring 21 abuts an inner circumferential surface of the shim 30. The anti-extrusion ring 21 is manufactured from a stiffer material than the dynamic side of sealing element 25 and is adapted for substantially preventing the dynamic side from deforming into the downstream gap 8 between the inner and outer swivel members 1,2. Thus the addition of the anti-extrusion ring element 21 allows the sealing arrangement 20" being used in high pressure swivels. It will be understood that such an anti-extrusion ring may also be used in combination with the textured inner surfaces of the peripheral groove as shown in FIG. 4A.

Figure 5A:
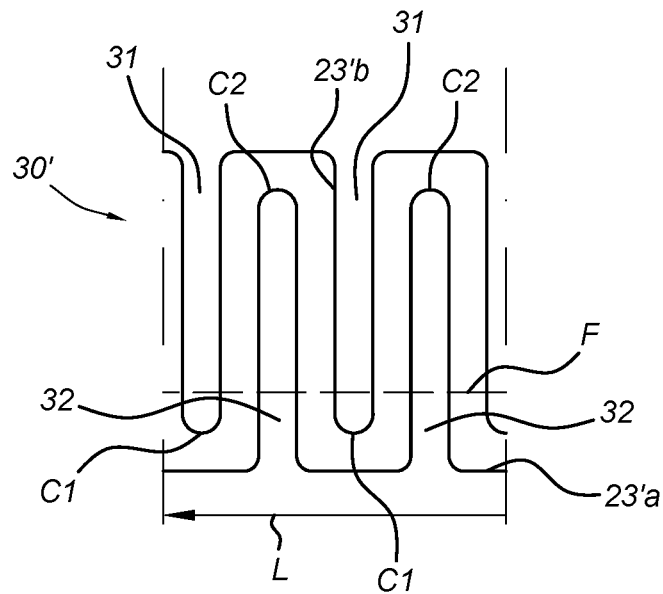
FIGS. 5A-5D show examples of three textured surfaces in sections of a shim according to an embodiment of the invention.
Figure 5B:
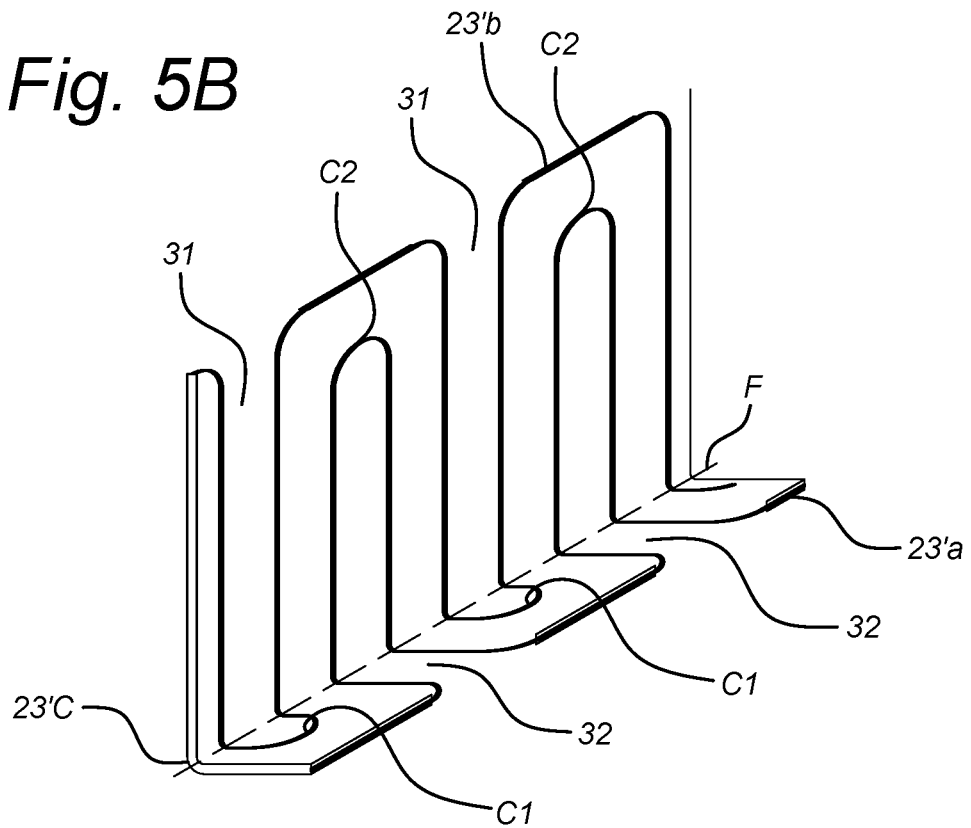
Figure 5C:
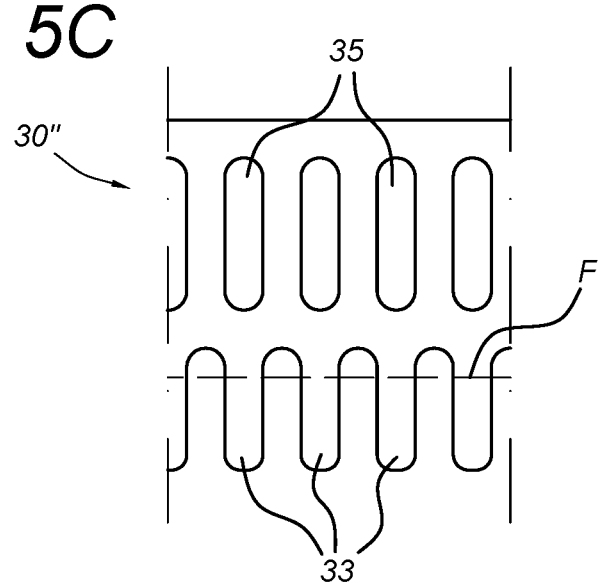

FIGS. 5A and 5B respectively show a flattened view and an isometric view of a section of a shim 30' provided with a textured surface. FIGS. 5C and 5B show flattened views of sections of alternative shims 30" and 30''' that are provided with a textured surface. Though only sections of the shims are shown, it will be appreciated that each shims may be of a length substantially corresponding to the length of the groove into which the shim is to be placed.

The shim-section 30' shown in FIGS. 5A and 5B has a zig-zag shape which extends in a circumferential direction L of the peripheral groove, the zig-zag shape having inner corners C1, C2 respectively near bottom end 23'$b$ and the top 23'$b$ ends 23'$a$ of the shim. In FIG. 5A the shim-section 30' is shown as an unfolded strip. Prior to being placed in a groove, the bottom end 23'$b$ of strip is preferably folded relative to top end 236 of the strip about fold line F, so that the two ends are at an angle of substantially perpendicular to each other.

The inner corners C1 face elongated openings 31 which are open at the top end 23'$b$, and the inner corners C2 face elongated openings 32 which are open at the bottom end 23'$a$. The shim thus provides a three-dimensional textured surface, with openings 31,32, in particular edges thereof, forming textural elements for making frictional contact with the sealing element. When the shim is placed in the groove, the longitudinal directions of the openings 31 will be arranged in a radial plane of the groove.

When the shim 30' is folded to have an L-shaped cross-section, as shown in FIG. 5B, the openings 31 extend from a first side of the folding line F to a second side thereof, such that liquid can flow through each of the openings 31 in the shim 30' from the lower end of the textured surface 23'$a$ to the upper end of the textured surface 23'$b$. This provides the zig-zag shape with excellent flushing capability, making the zig-zag shape a preferred shape for the removal of trapped liquids. The shim-section 30' is shown in a folded state in the peripheral view of FIG. 4B. The lower end of the vertical leg 23'$c$ is formed at the folding line F.

The shim-section 30" shown in FIG. 5C is a strip of material extending in the circumferential direction L of the peripheral groove, having a series of fingers 33 of substantial equal width and length extending perpendicular to the circumferential direction of the peripheral groove from a position above the folding position along folding line F of the strip to the bottom end forming the bottom end of the textured surface 23'$a$ and spaced at substantially equal distances from one another. A series of longitudinal openings 35 extending perpendicular to the circumferential direction L of the peripheral groove having substantially equal lengths and being spaced at equal distances from one another are provided in the strip above the fingers 33, each opening 35 being closed near the top end forming the upper end of the textured surface 23'$b$. The openings being formed discontinuous between the upper and lower ends 23'$a$, 23'$b$ of the textured surface provide a less direct and therefore slower flow path for trapped liquids, but provide the textured surface with improved strength and stability in the circumferential direction L.

Figure 5D:
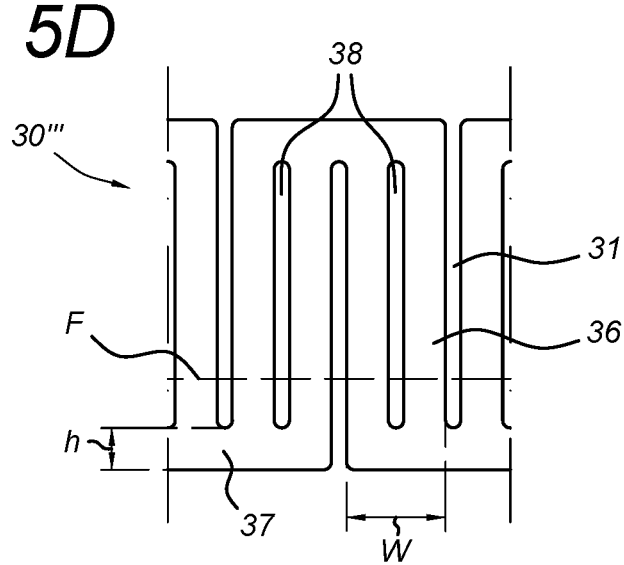

The shim-section 30''' shown in FIG. 5D has a zig-zag shape similar to the zig-zag shape shown in FIG. 5A, with the difference that the vertical sections 36 of each zig-zag have a width w which is larger than a height h of the horizontal sections 37 thereof and are provided with longitudinal openings 38 extending perpendicular to the circumferential direction L of the peripheral groove and each opening being closed near the top and bottom ends forming the bottom and top ends of the textured surface 23'$a$, 23'$b$ provided by the shim-section. When the shim 30''' is folded along the folding line F to have an L-shaped cross-section, liquid can flow out of each of the openings 31, 38 in the shim towards the downstream side of the gap between the inner and outer swivel members.

The shim-sections 30', 30", 30''' may be formed from commonly available strips of material commonly used for forming springs for spring-energized seals or from specifically machined shim-strips. These shim-strips may be machined using techniques such as punching, engraving, laser cutting, water jet cutting or milling. After obtaining the shim-strips, said strips are bent along a folding line F to form a shim having a L-shaped cross-section. The shim may have a relatively short length compared to the circumference of the peripheral groove, such that multiple shims are used in a single peripheral groove to provide textured surface sections along the full circumference. Preferably, the shim-strip is of such a length that the resulting shim is sufficiently long to cover the entire circumference of the peripheral groove, such that a continuously patterned inner surface section is present along the full circumference. In the latter case, the two ends of the shim may be joined, for example using welding, to form a circular shim. When the shim is inserted into the peripheral groove, the shim curves such that the vertical leg of the shim conforms to the curvature of the adjoining inner side surface 12 of the peripheral groove 7, automatically determining the radius of the adjoining end of the horizontal leg of the shim and forcing the opposing, free end of the horizontal leg to take up a smaller radius. In the shim sections shown in FIGS. 5A-5C, the lower ends below the folding line F comprise a plurality of equidistant segments, allowing the lower ends to undergo in-plane bending without experiencing excessive compressive forces.

The present invention has been described above with reference to a number of exemplary embodiments as shown in the drawings. Modifications and alternative implementations of some parts or elements are possible, and are included in the scope of protection as defined in the appended claims.

The invention claimed is:

1. A swivel comprising
an inner swivel member and an outer swivel member that is arranged rotatably around the inner swivel member, wherein the swivel members have respective fluid paths communicating with each other through an annular space at an interface between the swivel members;
a sealing arrangement on a side of the annular space at the interface, the sealing arrangement comprising:
a peripheral groove provided in the inner swivel member or in the outer swivel member; and
a sealing element received within the peripheral groove and arranged to statically seal against a first one of the swivel members inside the peripheral groove and to dynamically seal against a second one of the swivel members;
wherein a surface inside the peripheral groove in the first one of the swivel members abutting the sealing element is a textured surface extending along at least a part of two inner surfaces of the peripheral groove, the textured surface having three-dimensional textural elements for making frictional contact with the sealing element and wherein a cross-sectional shape of the textured surface, seen perpendicular to a radial plane of the peripheral groove, is substantially L-shaped textured surface, and wherein the sealing arrangement comprises a shim, positioned between the sealing element and an inner surface of the peripheral groove in the first one of the swivel members, wherein the shim forms an L-shape, and,
wherein a first leg of the L-shaped textured surface extends along an inner side surface of the peripheral groove and wherein a second leg of the L-shaped textured surface extends along a first part of a bottom surface of the peripheral groove, such that a second part of the bottom surface is non-textured and wherein the sealing element abuts both the first and second part of the bottom surface.

2. The swivel according to claim 1, wherein the textural elements comprise ridges, which each have a longitudinal direction substantially extending in a radial plane of the peripheral groove.

3. The swivel according to claim 1, wherein the textured surface is an inner surface of the peripheral groove in the first one of the swivel members extending over the inner side surface and at least part of the bottom surface of the peripheral groove.

4. The swivel according to claim 1, wherein the shim has an undulating or zig-zag shape extending along the circumferential direction of the peripheral groove, or wherein the shim 30") comprises protruding finger portions which extend perpendicular to the circumferential direction of the peripheral groove.

5. The swivel according to claim 4, wherein the shim is formed from a longitudinal strip of sheet material in which a series of parallel longitudinal openings or grooves perpendicular to the longitudinal direction of the strip forming the textural elements.

6. The swivel according to claim 5, wherein the undulating, zig-zag or protruding finger portions of the shim are formed by a number of series of parallel longitudinal openings or grooves in the shim extending into a side of the strip, such that said openings or grooves are not delimited on said side of the strip.

7. The swivel according to claim 6, wherein the shim is L-shaped when seen in the longitudinal direction, the L-shape having a folding line intersecting some of the number of the parallel longitudinal openings extending through a side of the strip.

8. The swivel according to claim 1, wherein the shim comprises or is made of a metallic material or metal alloy.

9. The swivel according to claim 1, wherein the textured surface is an evenly textured and uninterrupted surface extending along the entire circumference of the peripheral groove.

10. The swivel according to claim 1, wherein the sealing element comprises a lip-seal, which has two flexible legs arranged in a general C-, U- or V-shaped orientation with both legs extending between respective surfaces of the inner and outer swivel members.

11. The swivel according to claim 1, wherein the sealing element further comprises an anti-extrusion ring element abutting the textured surface.

12. A method of mounting a sealing element in a peripheral groove of a swivel, the swivel comprising:
an inner swivel member and an outer swivel member that is arranged rotatably around the inner swivel member, wherein the swivel members have respective fluid paths communicating with each other through an annular space at an interface between the swivel members;
a sealing arrangement on a side of the annular space at the interface, the sealing arrangement comprising:
a peripheral groove provided in the inner swivel member or the outer swivel member; and
a sealing element received within the peripheral groove and arranged to statically seal against a first one of the swivel members inside the peripheral groove and to dynamically seal against a second one of the swivel members;
wherein a surface inside the peripheral groove in the first one of the swivel members abutting the sealing element is a substantially L-shaped textured surface extending along at least a part of two inner surfaces of the peripheral groove, the substantially L-shaped textured surface having three-dimensional textural elements for making frictional contact with the sealing element;
the method of mounting the sealing element in the peripheral groove comprising:
inserting a sealing element within the peripheral groove, such that at least a part of one surface of the sealing element abuts one of the two adjoining substantially L-shaped textured surfaces and one adjoining surface of the sealing element abuts the other of the adjoining substantially L-shaped textured surfaces; and
positioning a shim between the sealing element and an inner surface of the peripheral groove in the first one of the swivel members, wherein the shim forms an L-shape, and wherein a first leg of the substantially L-shaped textured surface extends along an inner side surface of the peripheral groove and wherein a second leg of the substantially L-shaped textured surface extends along a first part of a bottom surface of the peripheral groove, such that a second part of the bottom surface is non-textured and wherein the sealing element abuts both the first and second part of the bottom surface.

13. The swivel according to claim 2, wherein the textured surface is an inner surface of the peripheral groove in the first one of the swivel members extending over the inner side surface and at least part of the bottom surface of the peripheral groove.

14. The swivel according to claim 2, wherein the shim comprises or is made of a metallic material or metal alloy.

15. The swivel according to claim 3, wherein the shim comprises or is made of a metallic material or metal alloy.

16. The swivel according to claim 4, wherein the shim comprises or is made of a metallic material or metal alloy.

17. The swivel according to claim 5, wherein the shim comprises or is made of a metallic material or metal alloy.

18. The swivel according to claim 2, wherein the textured surface is an evenly textured and uninterrupted surface extending along the entire circumference of the peripheral groove.

19. The swivel according to claim 3, wherein the textured surface is an evenly textured and uninterrupted surface extending along the entire circumference of the peripheral groove.

20. The swivel according to claim 4, wherein the textured surface is an evenly textured and uninterrupted surface extending along the entire circumference of the peripheral groove.

* * * * *